United States Patent
Akiyama

(10) Patent No.: US 9,008,914 B2
(45) Date of Patent: Apr. 14, 2015

(54) DRIVING SUPPORT SYSTEM FOR A VEHICLE

(75) Inventor: Tomonori Akiyama, Susono (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 0 days.

(21) Appl. No.: 14/347,060

(22) PCT Filed: Sep. 26, 2011

(86) PCT No.: PCT/JP2011/071894
§ 371 (c)(1),
(2), (4) Date: Mar. 25, 2014

(87) PCT Pub. No.: WO2013/046301
PCT Pub. Date: Apr. 4, 2013

(65) Prior Publication Data
US 2014/0229069 A1    Aug. 14, 2014

(51) Int. Cl.
*G08G 1/16*    (2006.01)
*B60T 7/12*    (2006.01)
*B60T 8/24*    (2006.01)
*B60T 7/22*    (2006.01)
(Continued)

(52) U.S. Cl.
CPC ... *G08G 1/16* (2013.01); *B60T 7/12* (2013.01); *B60T 7/22* (2013.01); *B60T 8/17558* (2013.01); *B60T 8/24* (2013.01); *B60W 30/09* (2013.01); *B62D 6/002* (2013.01); *B62D 15/0265* (2013.01); *G08G 1/165* (2013.01)

(58) Field of Classification Search
USPC .......... 701/41–42, 26; 318/466–467; 382/199
See application file for complete search history.

(56) References Cited

U.S. PATENT DOCUMENTS 6,404,158 B1 *   6/2002   Boisvert et al. ............... 318/469
7,747,370 B2 *   6/2010   Dix .................................. 701/50
(Continued)

FOREIGN PATENT DOCUMENTS

DE    102010002105 A1    8/2011
JP      2001-247023    9/2001
(Continued)

OTHER PUBLICATIONS

Adaptive control for manipulator with avoiding the collision problem; Sano, T. et al.; Industrial Electronics, Control & Instrumentation, 1994. IECON '94., 20th Inter. Conf. on; vol. 3; DOI: 10.1109/IECON.1994.398099; Pub Year: 1994 , pp. 1853-1858 vol. 3.*

(Continued)

*Primary Examiner* — Cuong H Nguyen
(74) *Attorney, Agent, or Firm* — Kenyon & Kenyon LLP

(57) ABSTRACT

In the present invention, when a solid object is recognized in the direction of movement of an own vehicle, in a system which carries out driving support of a vehicle, turning control of the vehicle is carried out in order to avoid a collision with the solid object. However, the execution of the turning control is permitted, in cases where a distance between the position of the own vehicle under turning control and the position of the solid object in an entire range of a turning control zone continuous between a predetermined control starting point at which the turning control of the own vehicle is started and a predetermined control ending point at which the turning control ends becomes equal to or less than a predetermined avoidance distance at which it is determined to avoid the collision with the solid object.

20 Claims, 9 Drawing Sheets

(51) Int. Cl.
*B60T 8/1755* (2006.01)
*B60W 30/09* (2012.01)
*B62D 6/00* (2006.01)
*B62D 15/02* (2006.01)

(56) References Cited

U.S. PATENT DOCUMENTS

| | | | | |
|---|---|---|---|---|
| 7,953,526 | B2* | 5/2011 | Durkos et al. | 701/25 |
| 8,209,075 | B2* | 6/2012 | Senneff et al. | 701/23 |
| 8,239,083 | B2* | 8/2012 | Durkos et al. | 701/26 |
| 8,645,016 | B2* | 2/2014 | Durkos et al. | 701/26 |
| 2001/0020217 | A1 | 9/2001 | Matsuno | |
| 2002/0121872 | A1* | 9/2002 | Boisvert et al. | 318/469 |
| 2007/0198159 | A1* | 8/2007 | Durkos et al. | 701/50 |
| 2009/0228166 | A1* | 9/2009 | Durkos et al. | 701/26 |
| 2013/0124041 | A1 | 5/2013 | Belser et al. | |
| 2014/0188365 | A1* | 7/2014 | Nagata | 701/93 |
| 2014/0195141 | A1* | 7/2014 | Nagata | 701/301 |
| 2014/0229069 | A1* | 8/2014 | Akiyama | 701/41 |

FOREIGN PATENT DOCUMENTS

| | | |
|---|---|---|
| JP | 2004-078333 A | 3/2004 |
| JP | 2010-163164 | 7/2010 |
| JP | 2010-173616 A | 8/2010 |
| JP | 2010-274880 | 12/2010 |
| JP | 2011-005893 | 1/2011 |

OTHER PUBLICATIONS

Cooperative AUV motion planning using terrain information; Hausler, A.J. et al.;OCEANS—Bergen, 2013 MTS/IEEE DOI: 10.1109/OCEANS-Bergen.2013.6608137; Pub. Year: 2013 , pp. 1-10.*

Real time path planning for threat assessment and collision avoidance by steering; Eidehall, A. ; Madas, D.; Intelligent Transportation Systems—(ITSC), 2013 16th International IEEE Conference on; DOI: 10.1109/ITSC.2013.6728349; Pub. Yr: 2013 , p. 916-921.*

Cooperative collision avoidance for multi-vehicle systems using reinforcement learning; Wang, Q. ; Phillips, C.; Methods and Models in Automation and Robotics (MMAR), 2013 18th Inter. Conf. on; DOI: 10.1109/MMAR.2013.6669888; Pub.Yr: 2013 , p. 98-102.*

A hybrid controller for autonomous vehicle lane changing with epsilon dragging; Whitsitt, S. ; Sprinkle, J.; American Control Conference (ACC), 2014; DOI: 10.1109/ACC.2014.6859450; Publication Year: 2014 , pp. 5307-5312.*

Tangent graph based navigation of a non-holonomic mobile robot in cluttered environments; Savkin, A.V. ; Hoy, M.; Control & Automation (MED), 2011 19th Mediterranean Conf on; DOI: 10.1109/MED.2011.5983068; Pub Yr: 2011, p. 309-314.*

Control of omini-directional mobile vehicle for obstacle avoidance using potential function method; Giang Hoang ; Hak Kyeong Kim ; Sang Bong Kim; Control Conf. (ASCC), 2013 9th Asian; DOI: 10.1109/ASCC.2013.6606195; Pub Yr: 2013 , pp. 1-6.*

Reactive Path Planning for 3-D Autonomous Vehicles; Belkhouche, F. ; Bendjilali, B.; Control Systems Technology, IEEE Transactions on; vol. 20 , Issue: 1; DOI: 10.1109/TCST.2011.2111372; Pub Year: 2012 , pp. 249-256.*

Aggressive terrain following for motion-constrained AUVs; Houts, S.E. ; Rock, S.M. ; McEwen, R.; Autonomous Underwater Vehicles (AUV), 2012 IEEE/OES; DOI: 10.1109/AUV.2012.6380749; Publication Year: 2012 , pp. 1-7.*

* cited by examiner

DRIVING SUPPORT SYSTEM FOR A VEHICLE

CROSS-REFERENCE TO RELATED APPLICATIONS

This is a national phase application based on the PCT International Patent Application No. PCT/JP2011/071894 filed on Sep. 26, 2011, the entire contents of which is incorporated herein by reference.

TECHNICAL FIELD

The present invention relates to a driving support technology for an own vehicle, such as a collision avoidance technology.

BACKGROUND ART

In the past, there has been developed a technology in which when a three-dimensional or solid object existing ahead of an own or subject vehicle is detected and a collision between the solid object thus detected and the subject vehicle is predicted, brakes are electrically operated so as to avoid the collision of the subject vehicle with the solid object by means of a braking force. However, only with the collision avoidance due to the braking force, there may occur a variation in the generated braking force depending on the condition of a traveling road surface or the state of tires, and in addition, such breaking may become a factor which causes sudden braking, in view of which there is developed a technology in which an avoidance operation is carried out by means of turning motions, in cases where sufficient collision avoidance can not be attained with the braking force (for example, see a first patent document).

PRIOR ART DOCUMENTS

Patent Documents

Patent Document 1: Japanese patent application laid-open No. 2001-247023

SUMMARY OF THE INVENTION

Problems to be Solved by the Invention

However, as in the conventional technology, when a driver tries to turn the own or subject vehicle so as avoid a collision with the solid object, the travel path of the subject vehicle after turning interferes with the travel paths of other vehicles than the subject vehicle, thus giving rise to a fear that contact of the vehicles may occur, depending on the timing of both the vehicles. That is, before the turning of the subject vehicle with respect to the solid object, the other vehicles than the subject vehicle were not to obstruct the progress or travel of the subject vehicle, but due to the turning of the subject vehicle, the other vehicles may obstruct the travel of the subject vehicle, or the subject vehicle may obstruct the travel of the other vehicles. On the other hand, in order to recognize those vehicles other than the subject vehicle which exist in the surroundings thereof at the time of travel of the subject vehicle, it is necessary, for example, to arrange sensors for detection at the side and rear of the subject vehicle, to predict the travel paths of neighboring vehicles, etc., based on the information obtained by these sensors, and to perform complicated judgment processing such as whether the travel paths of the neighboring vehicles may interfere with the travel path of the subject vehicle, at the time when the subject vehicle tries to turn so as to avoid the solid object.

The present invention has been made in view of the various circumstances as referred to above, and the object of the invention is to provide a system which carries out driving support such as collision avoidance of a vehicle, etc., and which is able to make a judgment as to whether turning control of an own vehicle is required for collision avoidance, in an appropriate manner, without accompanying complicated processing.

Means for Solving the Problem

In order to solve the above-mentioned problems, the present invention focuses, in a system for supporting collision avoidance of a vehicle, on a distance between the position of a subject vehicle and the position of a solid object in a turning control zone between a starting point and an ending point of turning control on an avoidance target path for avoiding a collision of the subject vehicle with the solid object, which may be caused by the turning of the subject vehicle. Because said distance in the turning control zone represents a possibility of the collision of the subject vehicle with the solid object, it is considered to be appropriate to avoid the turning control of the subject vehicle based on said distance.

Specifically, a driving support system for a vehicle according to the present invention is provided with: a recognition unit configured to recognize a solid object existing in a direction of movement of a subject vehicle; an acquisition unit configured to acquire an avoidance target path for avoiding a collision between the solid object and the subject vehicle based on a travel state of the subject vehicle, in cases where an existence of the solid object has been recognized by the recognition unit; a support control unit configured to perform turning control of the subject vehicle according to the avoidance target path acquired by the acquisition unit; and a turning permission unit configured to permit execution of the turning control of the subject vehicle by means of the support control unit based on a distance between the position of the subject vehicle under the turning control and the position of the solid object in a turning control zone on the avoidance target path on which the turning control of the subject vehicle is carried out by the support control unit.

In the driving support system according to the present invention, when the existence of the solid object is recognized in the direction of movement of the subject vehicle by means of the recognition unit, acquisition of the avoidance target path by the acquisition unit is carried out. This avoidance target path is a path for vehicle traveling which can be adopted by the vehicle in order to avoid the recognized solid object, and which is acquired based on the travel state of the subject vehicle. As this travel state, there can be exemplified a vehicle speed, a transverse or lateral acceleration, etc., of the subject vehicle. Here, with respect to the acquisition of the avoidance target path, no particular condition is imposed on the contents of the control with respect to the turning and braking of the subject vehicle for achieving traveling on the avoidance target path, but on the other hand, in cases where a driver wants to control the behavior of the subject vehicle at the time of turning or at the time of deceleration by braking to a predetermined state according to a predetermined purpose, etc., the avoidance target path may be acquired on the assumption that conditions according to the purpose are imposed on the control with respect to the turning and braking of the subject vehicle.

In addition, even in the case where the collision with the solid object can not be avoided completely, there can also be adopted, as the avoidance target path according to the present invention, a path with which a certain period of time can be obtained by turning until the subject vehicle comes into contact with the solid object, so that during such a period of time, the subject vehicle is decelerated to a certain extent thereby to enable the subject vehicle to travel so as to reduce shock at the time of the collision.

Then, in the driving support system according to the present invention, support control for collision avoidance with respect to the turning of the subject vehicle is carried out by the support control unit based on the avoidance target path acquired as mentioned above, but as to whether the support control is actually carried out, a judgment is made by the turning permission unit. The turning permission unit grasps the distance between the position of the subject vehicle and the position of the solid object on the avoidance target path in the turning control zone in which the turning control by the support control unit is carried out. The turning control zone is, so to speak, a zone in which the turning control is continued in order to avoid the collision of the subject vehicle with the solid object. The distance between the position of the subject vehicle and the position of the solid object on the avoidance target path in the turning control zone is to secure a rational reason for the subject vehicle to naturally avoid the collision with the solid object. On the other hand, it is to secure that no rational reason exists for vehicles lying in the surroundings of the subject vehicle to approach the vehicle which performs such turning control. Accordingly, by issuing permission for execution of turning control by means of the turning permission unit based on the above-mentioned distance in this manner, it becomes possible to make a judgment with respect to the turning control of the subject vehicle in an appropriate manner, without providing, on the subject vehicle, a sensor for detecting surrounding or neighboring vehicles, etc.

Here, in the above-mentioned driving support system for a vehicle, the turning permission unit may be configured such that the execution of the turning control of the subject vehicle by the support control unit is permitted, in cases where the distance between the position of the subject vehicle under the turning control and the position of the solid object in the turning control zone continuous between a predetermined control starting point on the avoidance target path at which the turning control of the subject vehicle is started by the support control unit and a predetermined control ending point at which the turning control on the avoidance target path ends becomes equal to or less than a predetermined avoidance distance at which it is determined to avoid the collision with the solid object. In cases where such a configuration is adopted, the turning permission unit grasps the distance between the position of the subject vehicle and the position of the solid object on the avoidance target path in the turning control zone which is defined from the predetermined control starting point and the predetermined control ending point on the avoidance target path. Then, the condition that the distance between the subject vehicle and the solid object in the turning control zone continues to be equal to or less than the predetermined avoidance distance means that for the subject vehicle, there exists a rational reason to naturally avoid the collision with the solid object, whereas for vehicles lying in the surroundings of the subject vehicle, there exists no rational reason to approach the vehicle which performs such turning control.

In other words, the distance being equal to or less than the predetermined avoidance distance means that the turning of the subject vehicle is an inevitable means to avoid a collision, because the subject vehicle is approaching to the solid object. In such a case, it can not be said that it is preferable for the travel state of the neighboring vehicles that the vehicles existing in the surroundings of the subject vehicle are still approaching toward the subject vehicle which is under turning control. In addition, as long as the neighboring vehicles are traveling normally, there will be an extremely low possibility that these vehicles are approaching the subject vehicle after being turned. Accordingly, in such a case, it is reasonable to consider that the turning of the subject vehicle can be permitted in order to avoid a collision with the solid object. Thus, in cases where the distance is equal to or less than the predetermined avoidance distance, the turning permission unit issues permission for the turning control of the subject vehicle, so that the support control unit carries out the turning control in order to avoid the collision of the subject vehicle. Here, note that the predetermined avoidance distance is appropriately defined as such a distance at which it can be accepted that the rational reason as mentioned above exists for the turning control of the subject vehicle.

In the driving support system for a vehicle as constructed in this manner, the turning control of the subject vehicle is permitted only in cases where the distance between the solid object and the subject vehicle in the turning control zone becomes equal to or less than the predetermined avoidance distance. For that reason, in cases where the distance between the subject vehicle and the solid object is secured and nonurgent turning control is not required during the time when the turning control is carried out, or in cases where the surrounding vehicles may come into a region in which the solid object no longer exists due to disappearance of the solid object during the turning control, the turning control of the subject vehicle is not carried out. Thus, a permission judgment about the turning control of the subject vehicle is carried out in this manner, whereby it becomes possible to make a judgment on the turning control of the subject vehicle in an appropriate manner, without providing, on the subject vehicle, a sensor for detecting the surrounding vehicles, etc.

Moreover, in the above-mentioned driving support system for a vehicle, in cases where the distance between the position of the subject vehicle under the turning control and the position of the solid object becomes equal to or less than the predetermined avoidance distance, in the entire range of the turning control zone, the turning permission unit may permit the execution of the turning control of the subject vehicle by the support control unit. By doing in this manner, an interval equal to or less than the predetermined avoidance distance is required in the entire range of the turning control zone, thus making it possible to perform the turning control of the subject vehicle in a safer manner.

Here, in the above-mentioned driving support system for a vehicle, the support control unit may cause the subject vehicle to travel along the avoidance target path, by carrying out the braking control of the subject vehicle in addition to the turning control. That is, the avoidance target path acquired by the acquisition unit is calculated on the assumption that the support control unit carries out the control on the turning of the subject vehicle as well as the control on the braking thereof, and the support control unit carries out the control on the turning and braking of the subject vehicle so that the subject vehicle can travel along the avoidance target path. Then, even at the time of carrying out such control on the turning and braking, the turning permission unit makes a judgment with respect to the permission of the turning control as mentioned above, if the turning control is carried out at all. Here, note that in cases where the execution permission of the turning control is not granted by the turning permission unit, the support control unit may carry out only the braking control of the subject vehicle.

Here, in the driving support system for a vehicle as stated above, the predetermined control starting point may be set based on the distance which is traveled by the subject vehicle for a delay time taken from when the turning permission unit permits the execution of the turning control of the subject vehicle until when the subject vehicle actually starts turning, and the position of the subject vehicle at the current point in time. As the delay time, there exists a mechanical and electric processing time taken inside the driving support system for a vehicle from when the execute permission of the turning control is issued by the turning permission unit, until when the turning of the subject vehicle is actually carried out. For that reason, even if the subject vehicle is actually permitted turning control, the subject vehicle will travel according to the speed of the vehicle at that time due to the delay time, and the turning control of the subject vehicle will be actually started after the delay time has elapsed. Accordingly, the predetermined control starting point at which the turning control is started is set based on the distance traveled by the subject vehicle due to this delay time, and the current position of the subject vehicle, whereby it becomes possible to grasp the distance between the subject vehicle and the solid object in the turning control zone in a more accurate manner.

Further, in the driving support system for a vehicle as stated above, in cases where the support control unit causes the subject vehicle to travel along the avoidance target path by carrying out the braking control of the subject vehicle in addition to the turning control, the predetermined control ending point may be set as a stop point in the avoidance target path at which the subject vehicle is stopped by the turning control and the braking control of the subject vehicle being carried out by means of the support control unit. Thus, with the predetermined control ending point being set in this manner, a rational reason will exist in the collision avoidance travel of the subject vehicle which is in a stopped state or is going to arrive at a stopped state in the case of the subject vehicle having been able to avoid the collision with the solid object by means of turning and braking thereof.

Furthermore, the predetermined control ending point of the turning control may be set, in another method, as the position of the subject vehicle in the avoidance target path at a time point at which the subject vehicle begins to move away from the solid object due to the turning control of the subject vehicle being carried out by the support control unit, or at a time point at which the distance between the subject vehicle and the solid object begins to be constant due to the turning control of the subject vehicle being carried out by the support control unit. Thus, with the predetermined control ending point being set in this manner, too, similarly to the above-mentioned case, a rational reason will exist in the turning in the turning control zone, which is specified based on the position of the subject vehicle at the time point at which the subject vehicle begins to move away from the solid object, or at the time point at which the distance of the subject vehicle to the solid object begins to be constant, i.e., at the time point at which the subject vehicle can be regarded as having avoided the collision with the solid object by means of turning.

Here, in the driving support system for a vehicle as stated above, in cases where the avoidance target path becomes a path in which the collision between the subject vehicle and the solid object can not be avoided, the turning permission unit may permit the execution of the turning control of the subject vehicle by the support control unit, without regard to the distance between the position of the subject vehicle under the turning control in the turning control zone and the position of the solid object. In the case where the avoidance target path becomes the path unable to avoid the collision between the subject vehicle and the solid object, the relative positional relation between the subject vehicle and the solid object is such that avoidance of the collision with the solid object will be difficult even if the subject vehicle turns around, so in such a case, the possibility that surrounding vehicles will be approaching toward the subject vehicle under the turning control is extremely low. Accordingly, in such a case, it is preferable to reduce the shock at the time of the collision of the subject vehicle as much as possible, by the execution permission of turning control being determined by the turning permission unit.

Advantageous Effect of the Invention

According to the present invention, it becomes possible to provide a system which carries out driving support such as collision avoidance of a vehicle, etc., and which is able to make a judgment as to whether turning control of an own vehicle is required for collision avoidance, in an appropriate manner, without accompanying complicated processing.

EMBODIMENTS FOR CARRYING OUT THE INVENTION

Hereinafter, a specific embodiment of the present invention will be described based on the attached drawings. Here, an example will be described in which the present invention is applied to a system which performs driving support for determining the travel path (lane) of an own (subject) vehicle and a three-dimensional (solid) object which is an obstacle thereon, and avoiding a deviation from the travel lane thus determined and a collision with the solid object, or reducing damage at the time of the collision. In addition, a construction described in the following embodiment shows one form of practical embodiment of the present invention, and does not limit the construction of the present invention.

Figure 1:
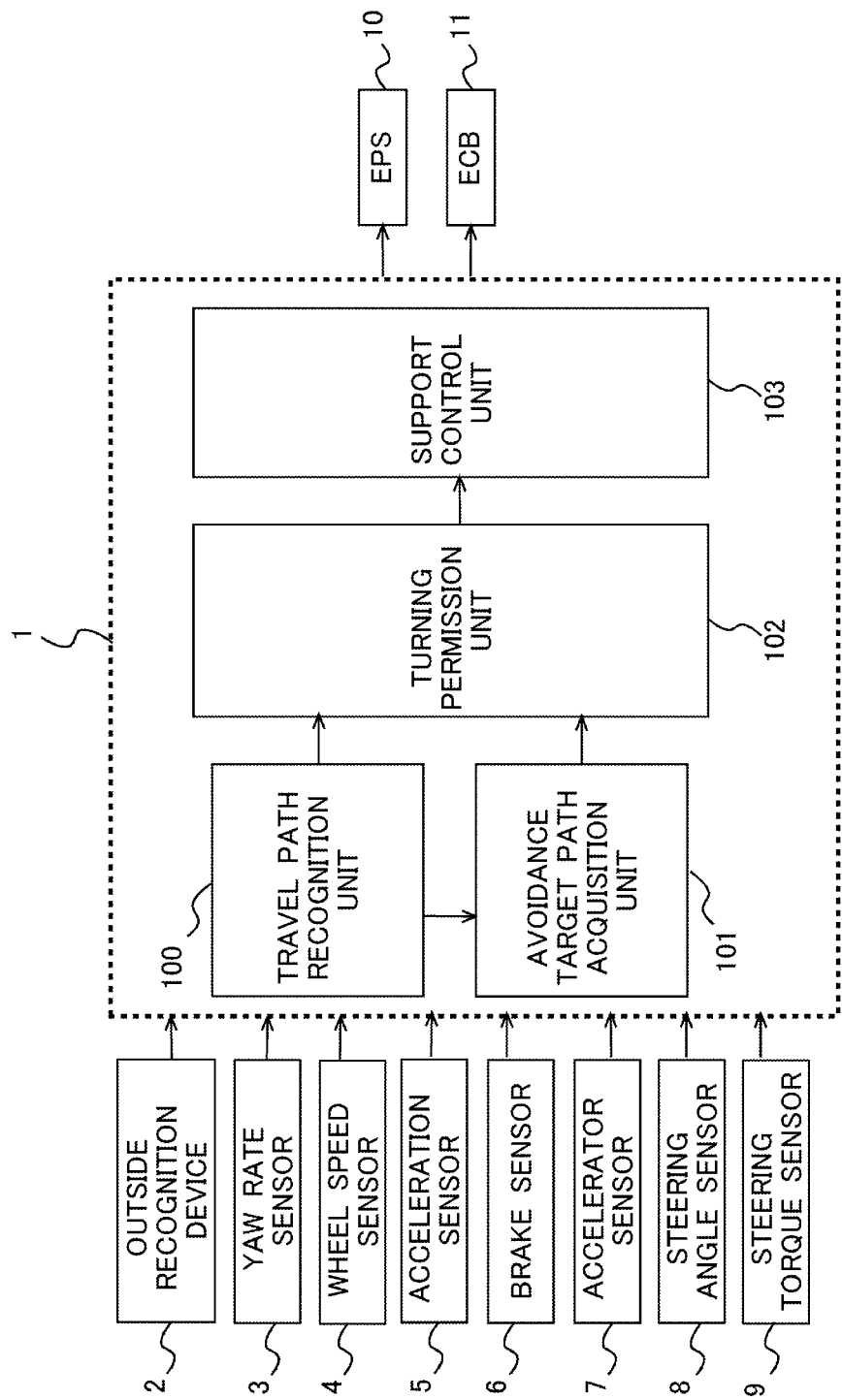
FIG. 1 is a view showing the construction of a driving support system for a vehicle according to the present invention.

FIG. 1 is a block diagram showing the construction of a driving support system for a vehicle according to the present invention in a function-based manner. As shown in FIG. 1, a control unit (ECU) 1 for driving support is mounted in a vehicle.

The ECU 1 is an electronic control unit which is provided with a CPU, a ROM, a RAM, a backup RAM, an I/O interface, and so on. A various kinds of sensors such as an outside recognition device 2, a yaw rate sensor 3, a wheel speed sensor 4, an acceleration sensor 5, a brake sensor 6, an accelerator sensor 7, a steering angle sensor 8, a steering torque sensor 9, and so on are electrically connected to the ECU 1, so that the output signals of these sensors are inputted to the ECU 1.

The outside recognition device 2 includes at least one of measuring devices such a, for example, an LIDAR (Laser Imaging Detection And Ranging), an LRF (Laser Range Finder), a millimeter wave radar, a stereoscopic camera, etc., and detects information with respect to the relative positions (e.g., a relative distance, a relative angle, etc.) of a three-dimensional or solid object 30 existing in the surroundings of the vehicle and an own or subject vehicle 20. Here, note that the detection of the information with respect to the solid object 30 by the outside recognition device 2 is widely disclosed in conventional technology, so the details thereof are omitted in this description. The yaw rate sensor 3 is mounted, for example, on the vehicle body of the subject vehicle 20, and outputs an electrical signal correlated with a yaw rate acting on the subject vehicle 20. The wheel speed sensor 25 is a sensor which is mounted on a road wheel of the subject vehicle 20, and outputs an electrical signal correlated with the travel speed of the vehicle (vehicle speed). The acceleration sensor 5 outputs an electrical signal correlated with an acceleration (longitudinal (front and rear) acceleration) which acts in the longitudinal (front and rear) direction of the subject vehicle 20, and an acceleration (transverse (lateral) acceleration) which acts in the transverse (right and left) direction of the subject vehicle 20. The brake sensor 3 is mounted, for example, on a brake pedal inside a passenger compartment, and outputs an electrical signal correlated with an operation toque (stepping or depression force) of the brake pedal. The accelerator sensor 7 is mounted, for example, on an accelerator pedal inside the passenger compartment, and outputs an electrical signal correlated with an operation toque (stepping or depression force) of the accelerator pedal. The steering angle sensor 8 is mounted, for example, on a steering rod connected to a steering wheel in the passenger compartment, and outputs an electrical signal correlated with a rotational angle (angle of rotation) from a neutral position of the steering wheel. The steering torque sensor 9 is mounted on the steering rod, and outputs an electrical signal correlated with a torque (steering torque) inputted to the steering wheel.

In addition, a variety of kinds of equipment such as an EPS (electric power steering) 10, an ECB (electronic controlled brake) 11, etc., are connected to the ECU 1. The EPS 10 is a device which assists the steering torque of the steering wheel by making use of the torque generated by an electric motor. The ECB 11 is a device which electrically regulates the operating oil pressure (brake oil pressure) of a friction brake provided on each road wheel.

The driving support system shown in FIG. 1 constructed in this manner achieves assist or support control for collision avoidance, etc., by the ECU 1 which electrically controls the EPS 10 and the ECB 11 based on the information from the above-mentioned various kinds of sensors, etc., which are connected to the ECU 1. Stated in another way, the ECU 1 has functions related to functional blocks shown in FIG. 1, in order to control the various kinds of equipment for the purpose of collision avoidance, etc., by making use of the output signals of the above-mentioned various kinds of sensors. That is, the ECU 1 is provided with a travel path recognition unit 100, an avoidance target path acquisition unit 101, a turning permission unit 102, and a support control unit 103.

The travel path recognition unit 100 generates information with respect to a road (travel path) on which the subject vehicle 20 will travel from now on, based on the information outputted from the outside recognition device 2. For example, in a coordinate system in which the subject vehicle 20 is located on the origin, the travel path recognition unit 100 generates information on the position coordinates of the solid object 30, which can be an obstacle to the subject vehicle 20, and indices indicating lane boundaries (e.g., traffic signs painted on the road, such as white lines, yellow lines, etc., which indicate lane boundaries, the solid object 30 such as curbstones extending at lane sides, guardrails, roadside gutters or ditches, walls, poles, etc.), and the posture (a distance, a yaw angle, etc.) of the subject vehicle 20 with respect to the solid object 30 or the lane boundaries. Here, note that the travel path recognition unit 100 corresponds to a recognition unit according to the present invention.

Figure 2:
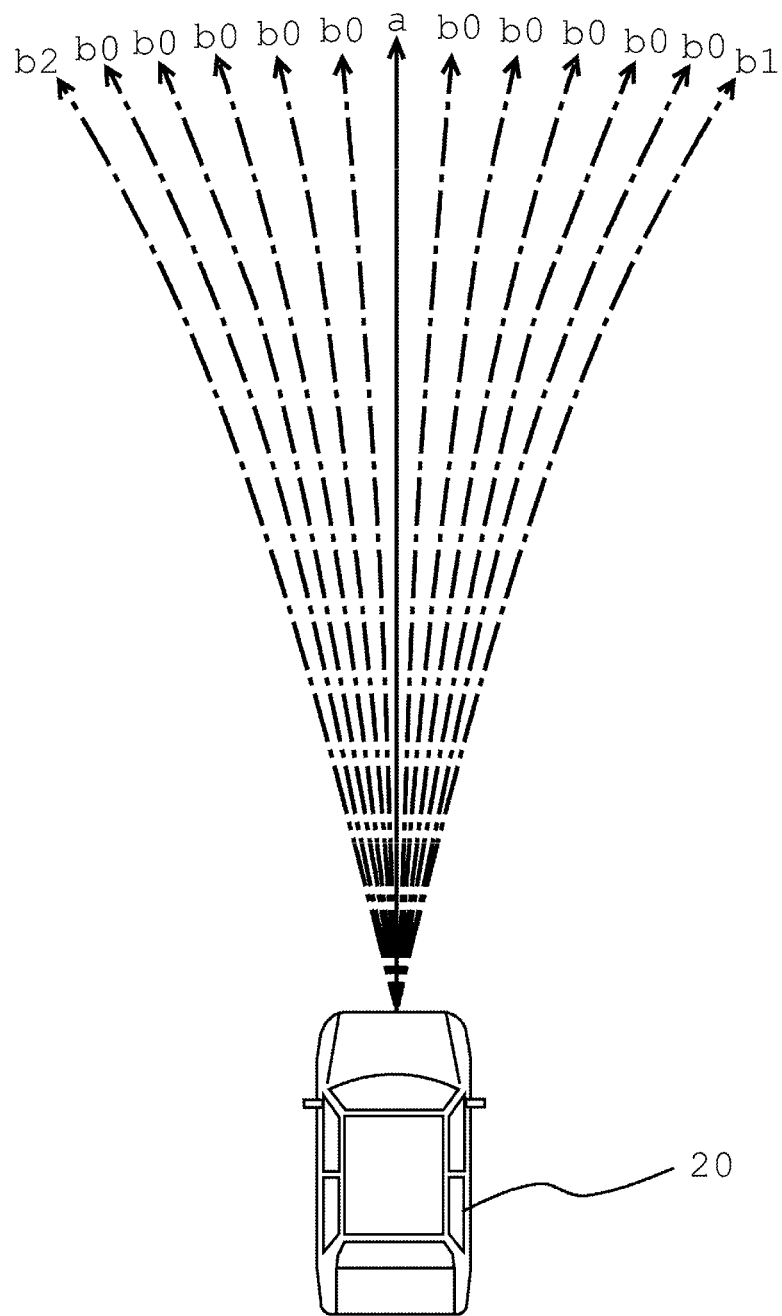
FIG. 2 is a view showing a travel range of a vehicle during traveling.

The avoidance target path acquisition unit 101 corresponds to an acquisition unit according to the present invention, and acquires the avoidance target path which the subject vehicle 20 can take, in order to avoid the collision with the solid object 30 recognized by the travel path recognition unit 100, in the coordinate system generated by the travel path recognition unit 100. This avoidance target path is a path which is acquired, for example, based on the travel state of the subject vehicle 20 such as the vehicle speed, the transverse acceleration, etc., of the subject vehicle 20. Specifically, the avoidance target path acquisition unit 101 acquires a current transverse acceleration Gy0 of the subject vehicle 20 from the output signal of the acceleration sensor 5, as shown in FIG. 2, and specifies a path a along which the subject vehicle 20 will pass if it is assumed that the subject vehicle 20 is traveling while maintaining the current transverse acceleration Gy0. Then, the avoidance target path acquisition unit 101 specifies a path b1 through which the subject vehicle 20 is predicted to pass, in cases where a maximum amount of change ΔGy of a transverse force required for the subject vehicle 20 to turn safely at the current speed of the subject vehicle 20 is added to the current transverse acceleration Gy0 of the subject vehicle 20, and at the same time, specifies a path b2 through which the subject vehicle 20 is predicted to pass, on the contrary, in cases where the maximum amount of change ΔGy of the transverse force is subtracted from the current transverse acceleration Gy0 of the subject vehicle 20. The maximum amount of change ΔGy should only be set as appropriate based on factors related to safe travel of the subject vehicle, such as the structure of the subject vehicle, the steering of the driver, etc.

With respect to the paths b1, b2, more specifically, the avoidance target path acquisition unit 101 should only calculate a turning radius R of the subject vehicle 20 from a value obtained by adding or subtracting the maximum amount of change ΔGy to or from the current transverse acceleration Gy0, and specify the paths b1, b2 based on the turning radius R thus calculated. Here, note that the turning radius R can be obtained by dividing the vehicle speed V by a yaw rate γ

(R=V/γ), and at the same time, the yaw rate γ can be obtained by dividing the transverse acceleration Gy by the vehicle speed V (γ=Gy/V). Of course, a detected value by the yaw rate sensor 3 may be used as the yaw rate γ. Thereafter, the avoidance target path unit 101 specifies a path b0 in cases where the transverse acceleration is changed by a fixed amount at a time in a range (i.e., a travel range) from the path b1 to the path b2. Here, note that this fixed amount of change of the transverse acceleration may be set in an appropriate manner. Then, a path in which the turning of the subject vehicle 20 can avoid collision without interfering with the solid object 30 is specified as the avoidance target path based on the extent of interference of the solid object 30 existing in the direction of movement of the subject vehicle 20 with the paths b1, b2 and a plurality of paths b0 set therebetween.

Then, the turning permission unit 102 has a function of first determining whether the achievement of the turning control of the subject vehicle is granted to enable the subject vehicle 20 to travel on the avoidance target path acquired by the avoidance target path acquisition unit 101, so as to prevent a collision between the solid object 30 recognized by the travel path recognition unit 100 and the subject vehicle 20, and then issuing the permission of execution, and it corresponds to a turning permission unit according to the present invention. The turning permission unit 102 makes a determination (or judgment) on the permission of execution of the turning control of the subject vehicle, based on the distance between the position of the subject vehicle which travels on the avoidance target path acquired by the avoidance target path acquisition unit 101, and the position of the solid object 30 recognized by the travel path recognition unit 100. Here, note that this distance is defined as a distance between a tangent line of the avoidance target path on which the subject vehicle will travel, and the solid object. The details thereof will be described later.

Next, the support control unit 103 corresponds to a support control unit according to the present invention, and on the consumption that the turning permission has been issued by the turning permission unit 102, the support control unit 103 carries out driving support control for avoiding the collision with the solid object 30 and for reducing or mitigating shock and damage at the time of the collision, through the EPS 10, the ECB 11, etc., based on the information generated by the travel path recognition unit 100 and the avoidance target path acquired by the avoidance target path acquisition unit 101. Specifically, the support control unit 103 calculates controlled variables of the EPS 10 and the ECB 11, and at the same time, operates the EPS 10 and the ECB 11 according to the controlled variables thus calculated. For example, the support control unit calculates a target yaw rate required for avoiding the collision between the subject vehicle 20 and the solid object 30, and decides a controlled variable (steering torque) of the EPS 10 and a controlled variable (brake oil pressure) of the ECB 11 in such a manner that an actual yaw rate of the subject vehicle 20 (an output signal of the yaw rate sensor 3) becomes coincide with the target yaw rate. At that time, the relation between the target yaw rate and the steering torque as well as the relation between the target yaw rate and the brake oil pressure may be mapped in advance.

Here, note that the method of decelerating the vehicle is not limited to a method of operating the friction brakes by means of the ECB 11, but there may also be used a method of converting (regenerating) the kinetic energy of the vehicle to electrical energy, or a method of changing the change gear ratio of a speed change gear (transmission) thereby to increase engine brake power. In addition, the method of changing the yaw rate of the vehicle is not limited to a method of changing the steering angle by means of the EPS 10, but there may also be used a method of applying different brake hydraulic pressures to the right and left wheels, respectively, of the subject vehicle 20.

Figure 3:
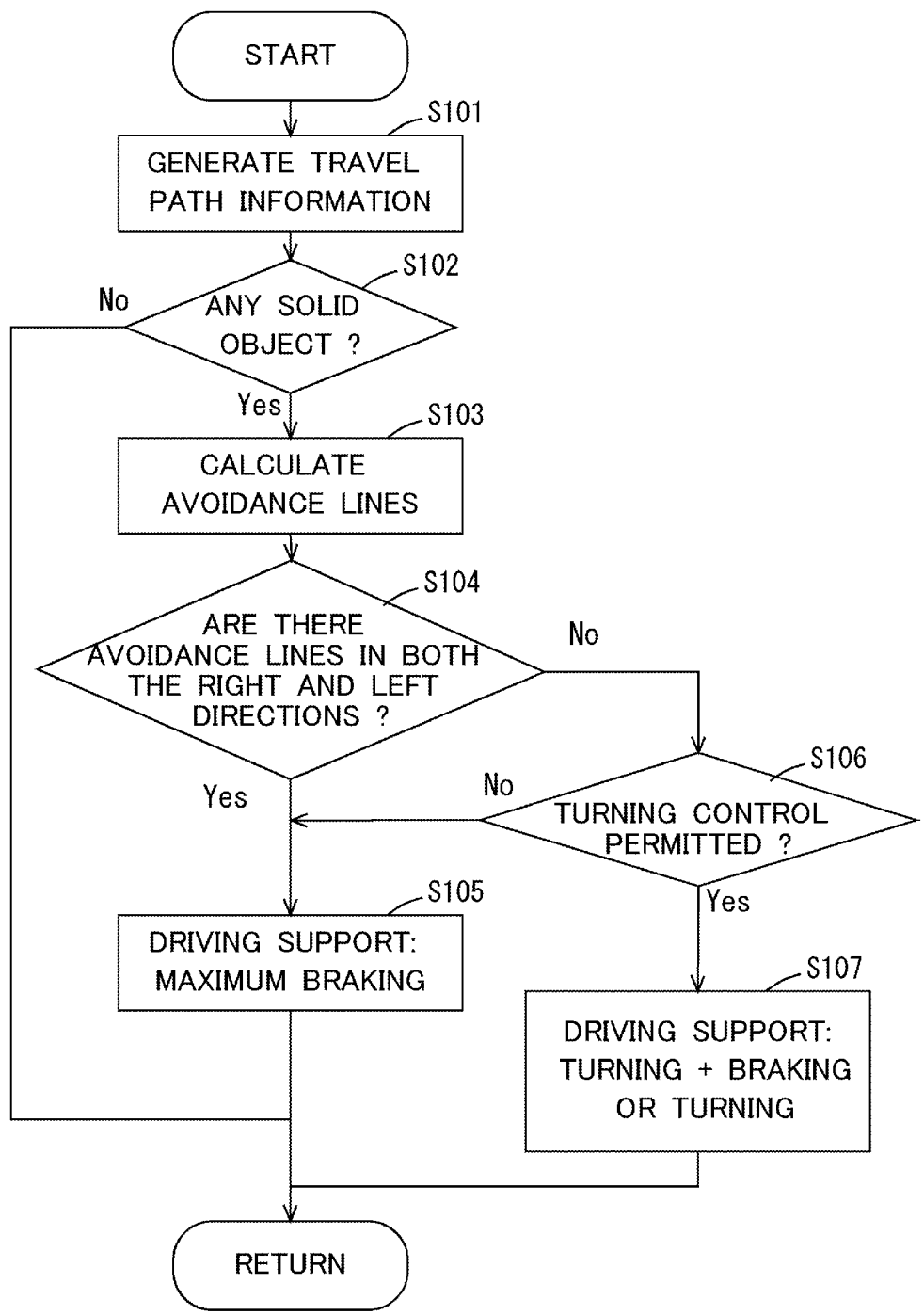
FIG. 3 is a flow chart of driving support processing carried out in the driving support system for a vehicle shown in FIG. 1.

Now, reference will be made to the processing for collision avoidance by the driving support system according to this embodiment, based on FIG. 3. The processing shown in FIG. 3 is a processing routine which is carried out by the ECU 1 in a repeated manner, and is stored as a control program in the ROM of the ECU 1, etc., in advance. First, in step S101, information with respect to a road on which the subject vehicle 20 will travel in the future is generated based on an output signal of the outside recognition device 2. That is, in the coordinate system in which the subject vehicle 20 is set as an origin, the ECU 1 generates information with respect to the position coordinates of the solid object 30, which can become an obstacle to the subject vehicle 20, and of indices showing lane boundaries, as well as the posture of the subject vehicle 20 with respect to the solid object 30 and/or the lane boundaries. After the processing of step S101 ends, the routine goes to step S102. Then, in step S102, the ECU 1 determines based on the above-mentioned information generated in step S101 whether the solid object 30 becoming an obstacle exists in the course direction of the subject vehicle 20. The "course" referred to herein is a path (e.g., the path a shown in FIG. 2) through which the subject vehicle 20 is predicted to pass in the case of continuing to travel while keeping the current transverse acceleration Gy0. In cases where the solid object 30 exists on this predicted path, or in cases where the solid object 30 exists in the range of a constant distance from this path, it will be judged that the solid object 30 exists in the direction of movement of the subject vehicle 20. When an affirmative determination is made in step S102, the routine goes to step S103, whereas when a negative determination is made, the ECU 1 once ends the execution of this routine. The processing according to the above-mentioned steps S101, S102 corresponds to processing according to the above-mentioned travel path recognition unit 100.

Subsequently in step S103, the transverse acceleration Gy0 at the current point in time of the subject vehicle 20 is read in by the above-mentioned avoidance target path acquisition unit 101 through the acceleration sensor 5, and a travel range in which the subject vehicle 20 can travel is calculated by adding or subtracting the maximum amount of change ΔGy of the above-mentioned transverse acceleration on the basis of the transverse acceleration Gy0 thus read in, so that travel paths capable of avoiding interference between the travel range and the solid object 30 are calculated as avoidance lines. These avoidance lines correspond to avoidance target paths in the present invention. After the processing of step S103 ends, the routine goes to step S104.

Figure 4A:
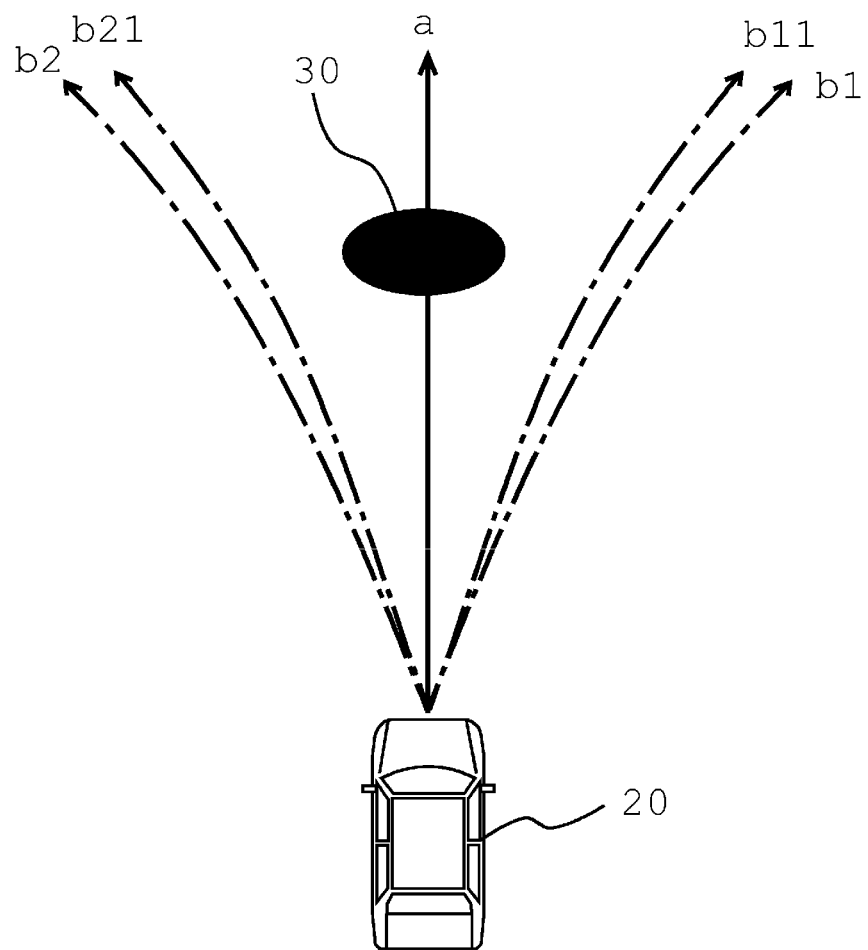
FIG. 4A is a first view showing an avoidance target path which the vehicle can take for collision avoidance with respect to a three-dimensional or solid object existing in the direction of movement.

In step S104, it is determined by the support control unit 103 whether avoidance lines to be taken in order to prevent the subject vehicle 20 from coming into collision with the recognized solid object 30 exist in both right and left directions of the subject vehicle 20 on the opposite sides of the solid object 30. This determination is to determine whether at least one avoidance line exists in each of the right and left directions (width directions) of the subject vehicle 20 on the basis of the solid object 30, wherein even if a plurality of avoidance lines exist, but in cases where they exist only in one direction among the right and left directions of the subject vehicle 20 on the basis of the solid object 30, a negative determination will be made in S104. For example, as shown in FIG. 4A, in cases where the solid object 30 is located substantially on a travel course a of the subject vehicle 20 and the width of the solid object 30 is relatively small, there exist, as avoidance lines, a path b11 in addition to the path b1 lying at the side of the path b1 corresponding to a maximum amount of change +ΔGy0 of the transverse acceleration, and a path b21 in addition to the path b2 lying at the side of the path b2 corresponding to a maximum amount of change −ΔGy of the transverse acceleration. Thus, in a state as shown in FIG. 4A, the paths b1, b11 exist as avoidance lines at the right side of the subject vehicle 20, and the paths b2, b21 exist as avoidance lines at the left side of the subject vehicle 20. Accordingly, in such a state, the avoidance lines exist in both the right and left directions (i.e., at the opposite sides) of the subject vehicle 20, and hence, in step S104, an affirmative determination is made.

Figure 4B:
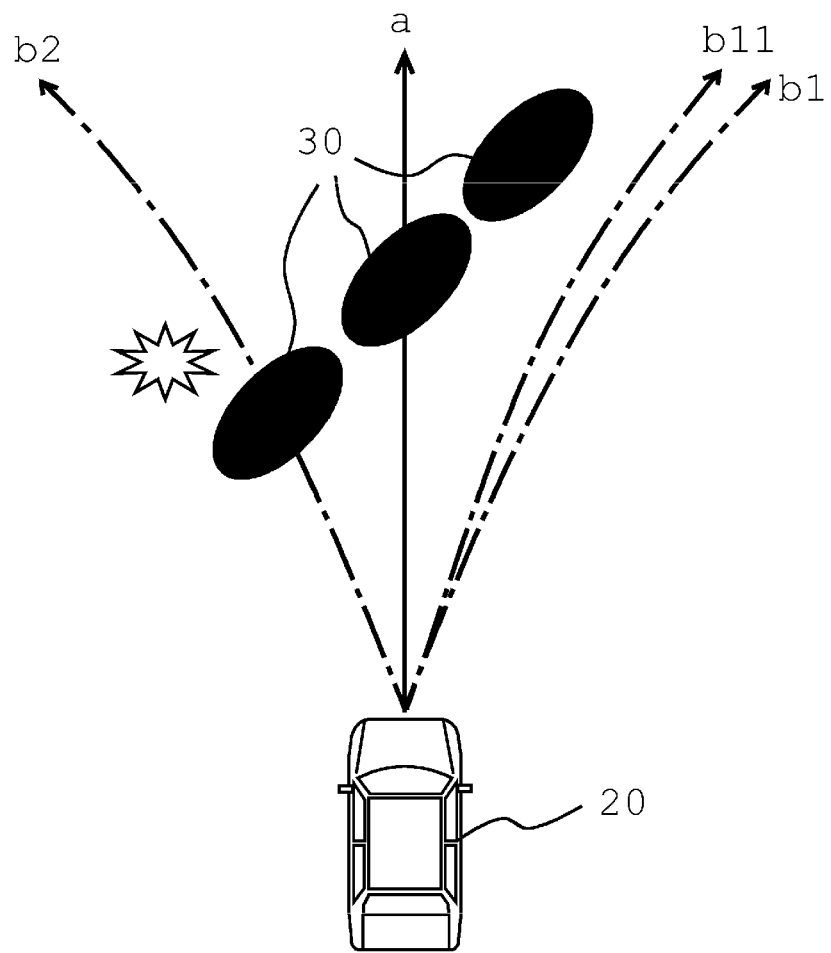
FIG. 4B is a second view showing an avoidance target path which the vehicle can take for collision avoidance with respect to the solid object existing in the direction of movement.

In addition, as shown in FIG. 4B, in cases where the solid object 30 is located on the travel course of the subject vehicle 20 and extends from the near front left side to the far front right side ahead of the subject vehicle 20, with its width being relatively long, the path b11 in addition to the path b1 exists, as an avoidance line, at the side of the path b1 corresponding to the maximum amount of change +ΔGy0 of the transverse acceleration, but no avoidance path exists at the side of the path b2 corresponding to the maximum amount of change −ΔGy of the transverse acceleration. This is due to the following reason. That is, the solid object 30 extends from the near front left side to the far front right side ahead of the subject vehicle 20, and hence, even if the transverse acceleration is changed by the maximum amount ΔGy0 in a minus direction so that the subject vehicle 20 travels on the path b2, the solid object 30 will come into interference with the subject vehicle on the path b2. In the case shown in FIG. 4B, avoidance lines exist only in the right direction (i.e., at the right side) of the subject vehicle 20 with the solid object 30 interposed therebetween, and hence, in step S104, an affirmative determination is made. Here, note that even if the number of avoidance lines decreases, leaving only the path b1, or even if a further more number of avoidance lines exist only at the right side of the subject vehicle 20 with respect to the solid object 30, there will be no change in the result of the determination.

In short, in this routine, when an affirmative determination is made in step S104, the routine goes to step S105, whereas when a negative determination is made, the routine goes to step S106. Here, in step S105, driving support processing for avoiding the collision between the solid object 30 and the subject vehicle 20 is carried out by the support control unit 103. This processing will be specifically explained based on FIG. 4A. As mentioned above, in the state shown in FIG. 4A, the avoidance lines which the subject vehicle 20 should take exist in both the right and left directions of the subject vehicle 20 at the opposite sides of the solid object 30. In other words, the subject vehicle 20 can avoid the collision with the solid object 30 by being turned to the right side, or by being turned to the left side, too. In such a case, if the support control unit 103 acts on the EPS 10 so as to cause the subject vehicle to turn either to the right or to the left, the driver of the subject vehicle 20 may steer to turn to the opposite direction. In that case, the driving support processing of the support control unit 103 interferes with driver's own steering, so it means for the driver that processing not matched to a driver's own feeling has been carried out.

Accordingly, in the driving support processing in step S105, the support control unit 103 does not carry out the turning of the subject vehicle 20, which is caused by changing the steering angle by means of the EPS 10, or by applying different brake hydraulic pressures to the right and left wheels, respectively, of the subject vehicle 20, but instead, carries out deceleration with a maximum braking force by means of the ECB 11. Here, note that in this processing, the support control unit 103 does not carry out control with respect to the turning of the subject vehicle 20, but instead, it is ensured for the driver that the driver can perform steering based on his or her own judgment. Thus, by carrying out, as the driving support processing, only deceleration by means of the braking force, and by leaving the turning of the subject vehicle 20 by means of steering to the discretion of the driver, it is possible to avoid the processing which is not matched to the feeling of the driver from being carried out. Here, note that in order to enable the turning of the subject vehicle by steering of the driver, it is preferable to generate a braking force which becomes a maximum in a range in which a transverse force such as required for the turning of the subject vehicle can be generated. However, as long as the subject vehicle 20 can be slowed down to a sufficient extent before colliding with the solid object 30, the braking force for deceleration of the subject vehicle 20 may be secured in preference to the transverse force for the turning by the steering of the driver. When the processing of step S105 ends, this routine is repeated again from the beginning.

On the other hand, in step S106, a determination is made as to whether turning control of the subject vehicle 20 may be carried out in order to avoid the collision with the solid object 30. This determination processing is carried out by the turning permission unit 102, and the details of the determination processing by the turning permission unit 102 will be described later. When an affirmative determination is made in step S106, the routine goes to step S107, whereas when a negative determination is made, the routine goes to step S105. In step S107 after the affirmative determination is made, the driving support processing for avoiding the collision between the solid object 30 and the subject vehicle 20, i.e., driving support processing including the control to turn the subject vehicle 20, is carried out by the support control unit 103, on the assumption that the turning control of the subject vehicle 20 is permitted. On the other hand, in cases where a negative determination is made in step S106, i.e., in cases where the turning control of the subject vehicle 30 is not permitted, the deceleration of the subject vehicle by the maximum braking force according to step S105 is carried out, in order to aim to stop the subject vehicle before its collision against the solid object, or in order to aim to reduce the vehicle speed at the time of the collision as much as possible.

Here, the processing according to step S107 will be specifically explained based on FIG. 4B. As mentioned above, in a state shown in FIG. 4B, the avoidance lines which the subject vehicle 20 should take exist only in the right direction (i.e., at the right side) of the subject vehicle 20 with respect to the solid object 30. In other words, the subject vehicle 20 can avoid the collision with the solid object 30 only by being turned to the right side. Thus, in cases where the direction of the turning of the subject vehicle 20 is limited, the direction of the turning of the subject vehicle 20, which the driver recognizes, and the direction of the turning of the subject vehicle 20, which the support control unit 103 recognizes, will match with each other. Accordingly, in such a case, by changing the steering angle by means of the EPS 10, or by applying different brake hydraulic pressures to the right and left wheels, respectively, of the subject vehicle 20, the support control unit 103 carries out driving support processing, so that the subject vehicle 20 travels on either of the paths b1, b11 shown in FIG. 4B, for example. Or, by carrying out the deceleration of the subject vehicle with the braking force by means of the ECB 11, in addition to such turning, it becomes possible to avoid the collision with the solid object 30 more safely. When the processing of step S107 ends, this routine is repeated again from the beginning.

Then, based on FIG. 5, reference will be made to turning permission processing in which it is determined whether the turning control of the subject vehicle 20 is permitted or not and which is carried out in the above-mentioned step S106. First, in step S201, with reference to the avoidance lines calculated in the above-mentioned step S103, an avoidable yaw rate $\gamma$ which is a yaw rate necessary for the subject vehicle 20 to travel on an avoidance line is calculated. Specifically, the yaw rate $\gamma$ is used for the calculation of the avoidance line as mentioned above, and so, with respect to the avoidance line which does not interfere with the solid object 30, the yaw rate thus calculated is set as the avoidable yaw rate $\gamma$. For example, in the state shown in FIG. 4B in which avoidance lines exist only at the right side of the subject vehicle 20 with respect to the solid object 30, avoidable yaw rates $\gamma 1$, $\gamma 11$ will be set for avoidance lines b1, b11, respectively, and these two yaw rates have a correlation of $\gamma 1 > \gamma 11$, as can be seen from the difference in the turning radius of the subject vehicle 20. After the processing of step S201 ends, the routine goes to step S202.

In step S202, it is determined whether there is any avoidance line for which an absolute value $|\gamma|$ of the avoidable yaw rate $\gamma$ calculated in step S201 becomes equal to or less than a predetermined threshold value $\gamma 0$. The predetermined threshold value $\gamma 0$ is to set an upper limit in the absolute value of a transverse acceleration which is generated during turning travel of the subject vehicle 20, in order to enable the driver to override steering angle control while the support control unit 103 is carrying out the steering angle control with respect to the EPS 10. For example, 0.2 G-0.3 G can be adopted as the threshold value $\gamma 0$. Stated in another way, the determination in step S202 is the processing for selecting a part of avoidance lines from among the calculated avoidance lines, so as not to make narrow the room or scope of steering by the driver due to an excessively large transverse acceleration generated at that time, although the subject vehicle 20 can avoid the collision with the solid object 30, even if any among the avoidance lines calculated in step S103 is selected. Here, it is assumed that in cases where any avoidance line capable of avoiding the collision with the solid object 30 can not be calculated in step S103, too, a negative determination is made in step S202 on the grounds that an avoidable yaw rate $\gamma$ can not be calculated. From the above, when an affirmative determination is made in step S202, the routine goes to step S203, whereas when a negative determination is made, the routine goes to step S206.

Figure 6:
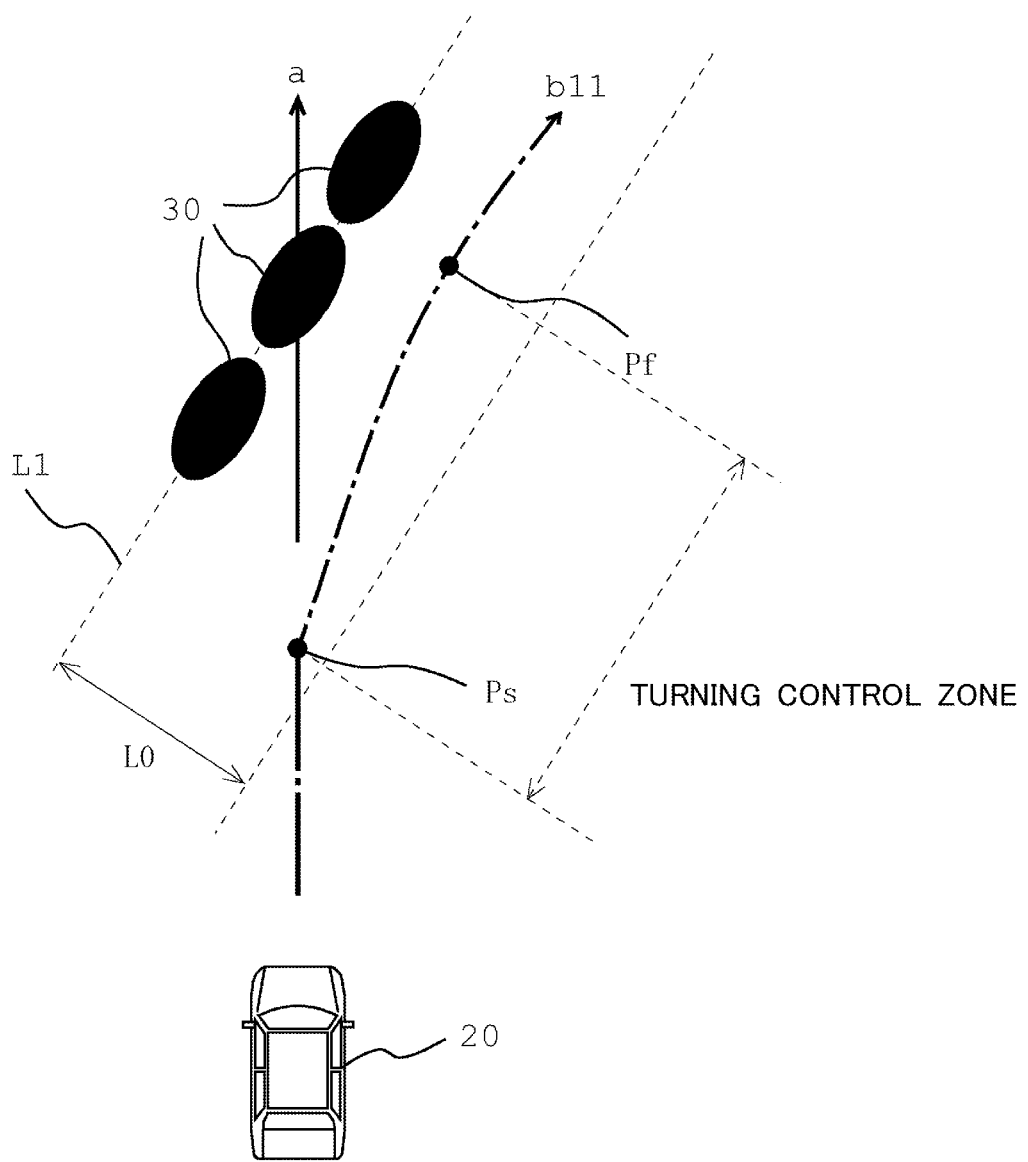
FIG. 6 is a view for explaining a judgment scheme for turning permission based on a distance between the subject vehicle and the solid object, in the turning permission processing shown in FIG. 5.

Then, in step S203, the calculation of a starting point Ps of the turning control of the subject vehicle 20 is carried out in the avoidance line(s) for which a determination has been made in step S202 that the absolute value of an avoidable yaw rate $\gamma$ becomes equal to or less than the threshold value $\gamma 0$ (in this embodiment, it is assumed that only avoidance line b11 satisfies this condition). This calculation processing will be explained based on FIG. 6. An avoidance line b11 shown in FIG. 6 is the same as the avoidance line b11 shown in FIG. 4B. Here, note that the avoidance line b1 is not selected as an object to be processed after step S203, because an avoidable yaw rate $\gamma$ generated in the case where the vehicle 20 travels on the avoidance line b1 becomes larger than the threshold value $\gamma 0$. Here, the turning control starting point Ps is specified as a traveling position of the subject vehicle 20 at the time when a command to turn the subject vehicle has been issued from the ECU 1 to the EPS 10, etc. Specifically, at the time of calculating an avoidance line in the above-mentioned processing of step S103, the avoidance line is calculated after the starting point of the timing control of the subject vehicle 20 has been specified, and hence, the turning control starting point specified at that time should just be set as the turning control starting point Ps shown in FIG. 6. Here, note that in the calculation of the turning control starting point Ps, it is preferable to take into consideration a delay time taken from when a command to start turning has been issued from the ECU 1 to the ESP 10, etc., after the execution of the turning control is permitted, to when the direction of movement of the vehicle 20 is actually changed by the driving of the EPS 10, etc., i.e., when a turning operation is started. Although the delay time varies according to the system, the construction of the subject vehicle 20, etc., it can be expected as a duration of about 0.3 seconds, for example. By doing in this manner, it is possible to specify the turning control starting point Ps in a more accurate manner. After the processing of step S203 ends, the routine goes to step S204.

Subsequently, in step S204, the calculation of a turning control ending point Pf at which the turning control for avoiding the collision with the solid object 30 is carried out. Although the turning control ending point Pf is defined as follows according to the contents of the driving support processing for collision avoidance, the definition shown below is just an example at all, and definitions other than this can also be adopted as necessary.

<In the Case Where Only Turning Control is Carried Out as Driving Support Processing>

The turning control ending point Pf may be defined as a point at which the direction of movement of the subject vehicle 20, as a result of the turning control thereof, begins to become parallel to a direction L1 in which the solid object 30 is located in a line. That is, when the direction of movement of the subject vehicle 20 becomes parallel to the direction in which the solid object 30 is located in a line, with the direction of movement of the subject vehicle 20 being maintained as it is, it will become possible to avoid the collision with the solid object 30, and so, the ending point Pf of the turning control is specified by this. Here, note that the line L1 indicating the direction in which the solid object 30 is located in a line may be specified based on a shape or the like of an existing region of the solid object 30 recognized by the travel path recognition unit 100, e.g., based on a line which passes through the center of gravity of the solid object 30, or a line which extends along the contour of the solid object 30.

In addition, in place of the above-mentioned example, the turning control ending point Pf may be defined as a point at which the subject vehicle 20 begins to move away from the solid object 30, as a result of the turning control. That is, it can be judged by an increase in the distance between the subject vehicle 20 and the solid object 30 that the possibility of the collision is reduced, and so, the ending point Pf of the turning control is specified by this judgment.

<In the Case Where Turning Control and Braking Control are Carried Out as Driving Support Processing>

Then, in cases where turning control and braking control are carried out as driving support processing, a point at which the subject vehicle 20 is stopped as a result of the turning control and the braking control may be defined as the turning control ending point Pf, in addition to the definition example of the turning control ending point Pf in the above-mentioned case where only the turning control is carried out. That is, even if the direction of movement of the subject vehicle 20 has not become parallel to the direction L1 in which the solid object 30 is located in a line, the ending point Pf of the turning control is specified by the fact that the collision with the solid object 30 can be avoided by the stopping of the subject vehicle 20.

After the processing of step S204 ends, the routine goes to step S205.

In step S205, in an entire range of a turning control zone which is defined as a part of avoidance line b11 sandwiched between the turning control starting point Ps calculated in step S203 and the turning control ending point Pf calculated in step S204, a determination is made as to whether the distance between the position of the subject vehicle 20 and the position of the solid object 30 is equal to or less than a predetermined avoidance distance L0. This predetermined avoidance distance L0 is a threshold value for rationally reasoning that the distance between the subject vehicle 20 and the solid object 30 becomes short to such an extent that a collision between them should be avoided. For example, the predetermined avoidance distance L0 is set based on an avoidance distance necessary for the subject vehicle 20 to achieve avoidance of the collision with the solid object 30 during traveling at a legal speed limit for a road surface on which it is traveling. In addition, as the distance between the subject vehicle 20 and the solid object 30, there can be adopted a distance between the subject vehicle 20 and the solid object 30 in the direction vertical with respect to the direction of movement of the subject vehicle 20 (in other words, in the tangential direction of the avoidance line). When an affirmative determination is made in step S205, the routine goes to step S206, whereas when a negative determination is made, the routine goes to step S207.

In step S206, a determination is made to permit turning control to be carried out with respect to the subject vehicle 20. Such processing (to permit turning control) is carried out in the following cases, i.e., a case where a negative determination has been made in the processing of step S202, and a case where an affirmative determination has been made in the processing of step S205, as mentioned above. The former case corresponds to a case where the collision with the solid object 30 can not be substantially avoided by the turning control of the subject vehicle 20, but even in such a case, it may become possible to reduce shock at the time of the collision, by performing turning control and at the same time decelerating the subject vehicle 20 by means of braking control during the turning control. Accordingly, based on such a possibility, the turning control of the subject vehicle 20 is permitted. Here, note that in such a case, it can be said that because the solid object 30 exists in the direction of movement of the subject vehicle 20, even if the subject vehicle 20 is subjected to turning control, a possibility for vehicles around the subject vehicle 20 to approach toward the subject vehicle 20 is extremely low, and hence, there exists a rational reason for being able to permit the turning control of the subject vehicle 20. On the other hand, the latter case corresponds to a case where the collision with the solid object 30 can be avoided by the turning control of the subject vehicle 20, but even in such a case, in the entire range of the turning control zone in which the turning control is continuously carried out, the subject vehicle 20 is in a state where the distance between the subject vehicle 20 and the solid object 30 becomes equal to or less than the threshold value L0, so it is necessary for the subject vehicle 20 to avoid the collision with the solid object 30, and in addition, it is considered that the possibility for the vehicles around the subject vehicle 20 to approach toward the subject vehicle 20 is extremely low. Accordingly, in such a case, too, it can be said that there exists a rational reason for being able to permit the turning control of the subject vehicle 20.

Figure 7A:
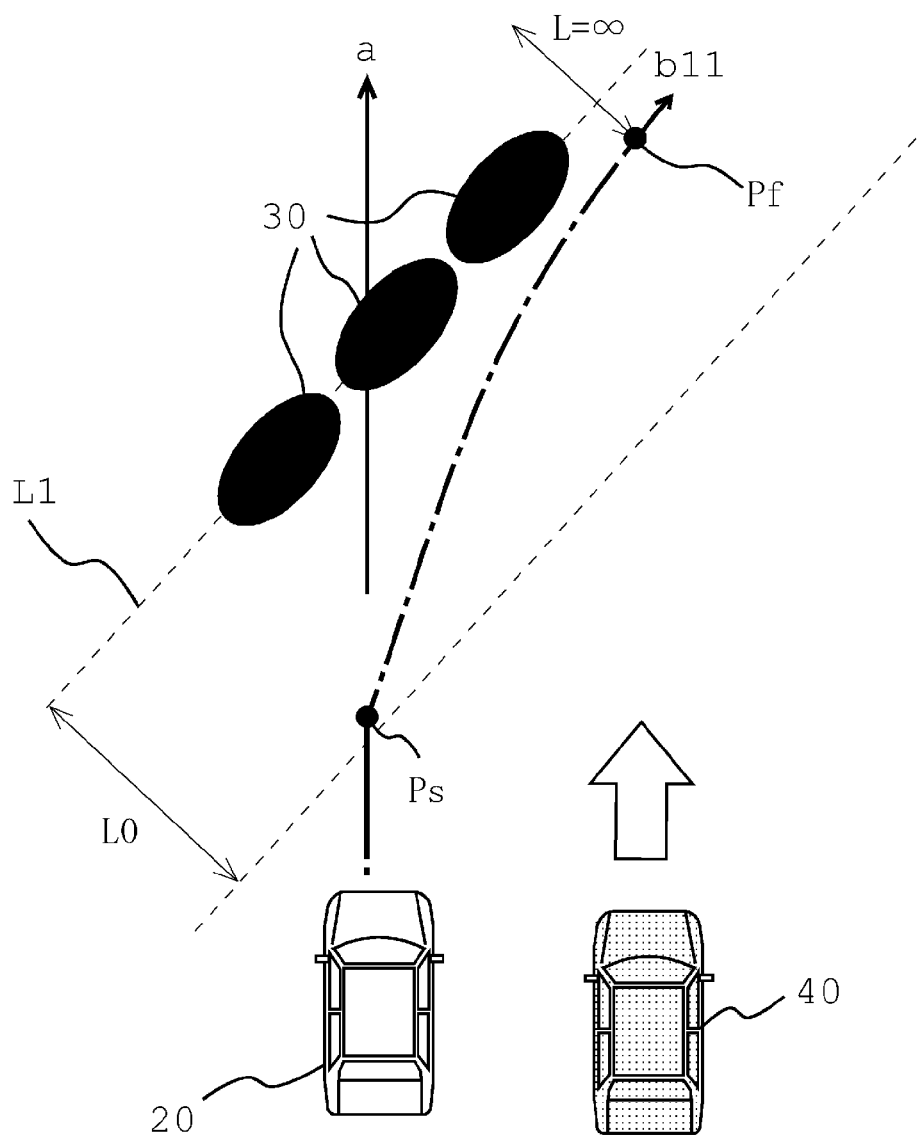
FIG. 7A is a first view showing a relative positional relation between the solid object and the subject vehicle with respect to the case where the turning of the subject vehicle is not permitted, in the turning permission processing shown in FIG. 5.
Figure 7B:
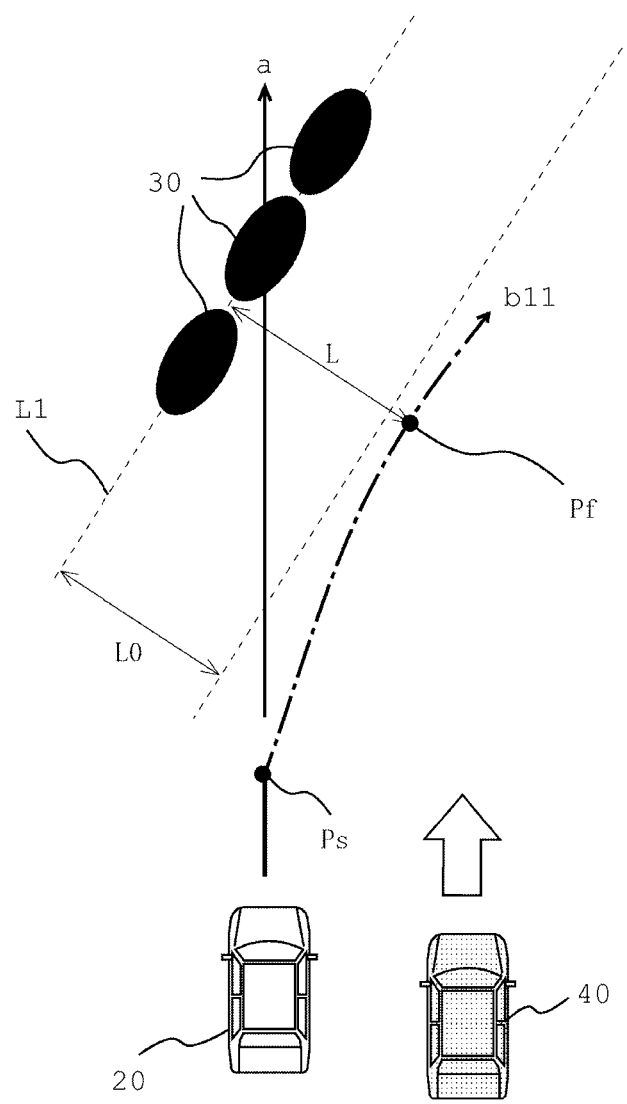
FIG. 7B is a second view showing a relative positional relation between the solid object and the subject vehicle with respect to the case where the turning of the subject vehicle is not permitted, in the turning permission processing shown in FIG. 5.

Then, in step S207, a determination is made to prohibit turning control from being carried out with respect to the subject vehicle 20, i.e., not to permit turning control. Here, examples in which the processing of step S207 is carried out are shown in FIG. 7A and FIG. 7B. In a state shown in FIG. 7A, in a certain range from the turning control starting point Ps within the turning control zone, the distance L between the subject vehicle 20 and the solid object 30 becomes equal to or less than the threshold value L0, but in the zone in the vicinity of the turning control ending point Pf, the solid object 30 does not exist in the direction vertical with respect to the direction of movement of the subject vehicle 20, so the distance L becomes substantially infinite. In such a case, during the time when the turning control is carried out with respect to the subject vehicle 20, a vehicle 40 existing in the surroundings thereof may come into a region in which the existence of the solid object 30 is broken or interrupted, i.e., a space in the vicinity of the turning control ending point Pf. In such a case, when the subject vehicle 20 is controlled to turn, it results in interrupting the direction of movement of the vehicle 40, and hence, it is preferable to judge that there exists no rational reason for permitting turning control with respect to the subject vehicle 20.

In addition, in a state shown in FIG. 7B, the subject vehicle 20 is in a state where the distance L between the subject vehicle 20 and the solid object 30 exceeds the threshold value L0 in the entire range of the turning control zone. That is, FIG. 7B shows the state in the case where the turning control of the subject vehicle 20 is intended to be carried out, though there is still a sufficient distance with respect to the solid object 30. When the subject vehicle 20 is controlled to turn in such a state, it likewise results in interrupting the direction of movement of the vehicle 40 existing in the surroundings thereof, and hence, it is preferable to judge that there exists no rational reason for permitting turning control with respect to the subject vehicle 20. Here, note that in the state shown in FIG. 7B, when the processing shown in FIG. 3 is repeated again, the subject vehicle 20 approaches the solid object 30, and if the state shown in FIG. 6 is formed at this time, the turning control of the subject vehicle 20 will be permitted.

Figure 5:
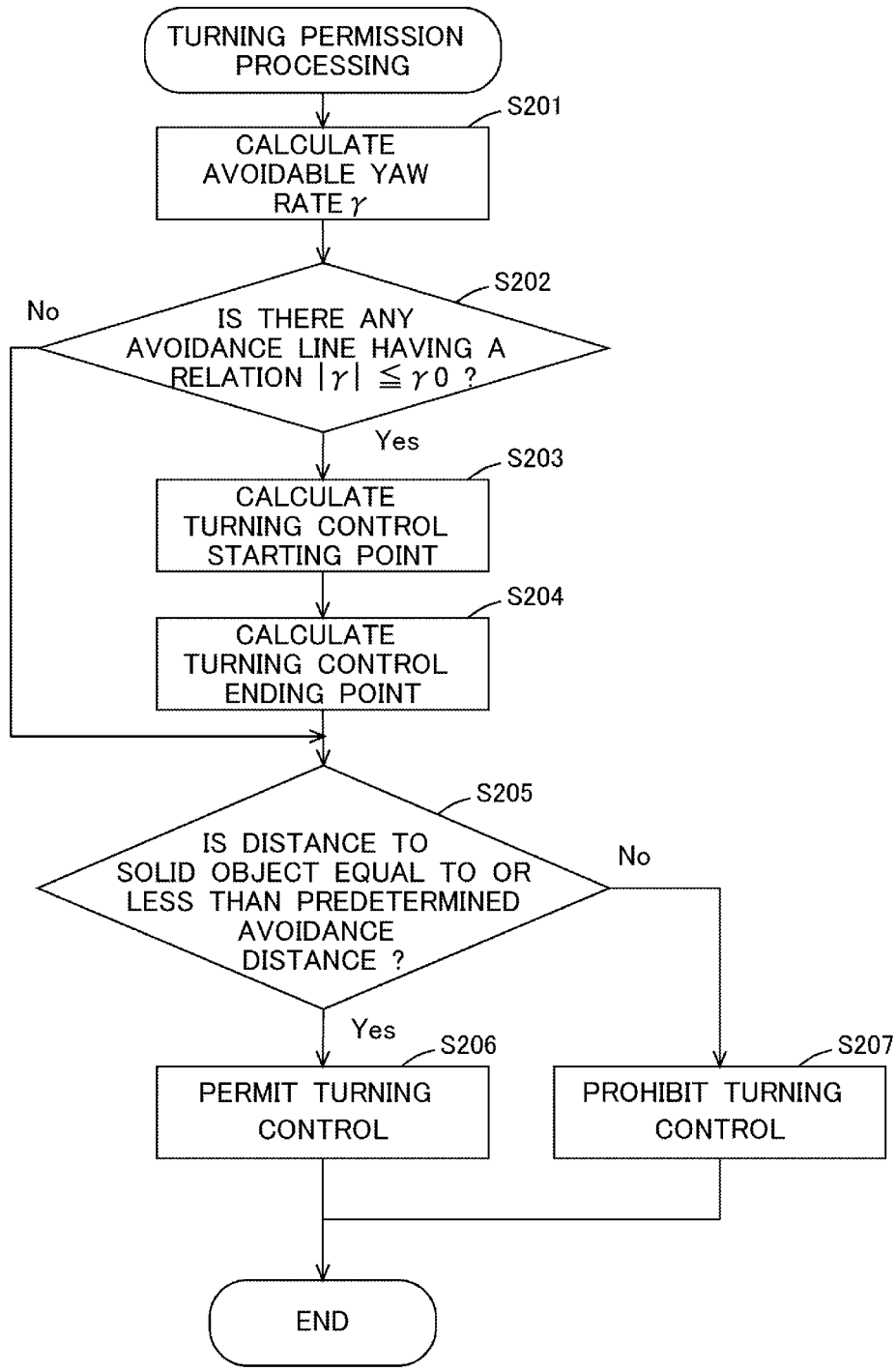
FIG. 5 is a flow chart of processing with respect to the permission of turning control of an own or subject vehicle, included in the driving support processing shown in FIG. 3.

According to the driving support processing shown in FIG. 3, including the turning permission processing shown in FIG. 5, the contents of processing to be carried out by the support control unit 103, is regulated according to whether avoidance lines, which the subject vehicle 20 should take when the solid object 30 has been recognized, exist in both the right and left directions of the subject vehicle 20 at the opposite sides of the solid object 30. As a result, it becomes possible to avoid the collision of the subject vehicle 20 with the solid object 30, while providing the driving support processing matched with the feeling of the driver of the subject vehicle 20. In addition, the turning control of the subject vehicle 20 is carried out based on the determination of the turning permission unit 102, thus making it possible to achieve the turning control of the subject vehicle 20 under the rational reason, without providing an additional sensor for detecting an existence of a vehicle around the subject vehicle.

Here, note that the driving support control shown in FIG. 3 is configured such that the turning control of the subject vehicle 20 is not carried out in cases where the avoidance lines which the subject vehicle 20 should take exist in both the right and left directions of the subject vehicle 20 at the opposite sides of the solid object 30, but even in such a case, in place of such a configuration, another one may be adopted in which either one of the avoidance lines is selected among in both the right and left directions, and turning control is carried out according to the avoidance line thus selected. Even in that case, the turning control of the subject vehicle 20 is carried out, only in cases where the turning permission unit 102 issues the permission of turning control, as stated above.

DESCRIPTION OF THE REFERENCE SIGNS

1 ECU
2 outside recognition device
3 yaw rate sensor
4 wheel speed sensor
5 acceleration sensor
6 brake sensor
7 accelerator sensor
8 steering angle sensor
9 steering torque sensor
10 EPS (electric power steering)
11 ECB (electronic controlled brake)
20 subject vehicle
30 solid object
100 travel path recognition unit
101 avoidance target path acquisition unit
102 turning permission unit
103 support control unit

The invention claimed is:

1. A driving support system for a vehicle comprising:
a recognition unit configured to recognize a solid object existing in a direction of movement of a subject vehicle;
an acquisition unit configured to acquire an avoidance target path for avoiding a collision between the solid object and the subject vehicle based on a travel state of the subject vehicle, in cases where an existence of the solid object has been recognized by the recognition unit;
a support control unit configured to perform turning control of the subject vehicle according to the avoidance target path acquired by the acquisition unit; and
a turning permission unit configured to permit execution of the turning control of the subject vehicle by means of the support control unit based on a distance between the position of the subject vehicle under the turning control and the position of the solid object in a turning control zone on the avoidance target path on which the turning control of the subject vehicle is carried out by the support control unit;
wherein the turning permission unit permits the execution of the turning control of the subject vehicle by the support control unit, in cases where the distance between the position of the subject vehicle under the turning control and the position of the solid object in the turning control zone continuous between a predetermined control starting point on the avoidance target path at which the turning control of the subject vehicle is started by the support control unit and a predetermined control ending point at which the turning control on the avoidance target path ends becomes equal to or less than a predetermined avoidance distance at which it is determined to avoid the collision with the solid object, whereas the turning permission unit prohibits the execution of the turning control of the subject vehicle by the support control unit, in cases where the distance exceeds the predetermined avoidance distance.

2. The driving support system for a vehicle as set forth in claim 1, wherein
the predetermined control end point is set as the position of the subject vehicle in the avoidance target path at a time point at which the subject vehicle begins to move away from the solid object due to the turning control of the subject vehicle being carried out by the support control unit, or at a time point at which the distance between the subject vehicle and the solid object begins to be constant due to the turning control of the subject vehicle being carried out by the support control unit.

3. The driving support system for a vehicle as set forth in claim 2, wherein
in cases where the avoidance target path becomes a path in which the collision between the subject vehicle and the solid object cannot be avoided, the turning permission unit permits the execution of the turning control of the subject vehicle by the support control unit, without regard to the distance between the position of the subject vehicle under the turning control in the turning control zone and the position of the solid object.

4. The driving support system for a vehicle as set forth in claim 1, wherein
the support control unit causes the subject vehicle to travel along the avoidance target path, by carrying out the braking control of the subject vehicle in addition to the turning control.

5. The driving support system for a vehicle as set forth in claim 4, wherein
the predetermined control end point is set as a stop point in the avoidance target path at which the subject vehicle is stopped by the turning control and the braking control of the subject vehicle being carried out by means of the support control unit.

6. The driving support system for a vehicle as set forth in claim 5, wherein
in cases where the avoidance target path becomes a path in which the collision between the subject vehicle and the solid object cannot be avoided, the turning permission unit permits the execution of the turning control of the subject vehicle by the support control unit, without regard to the distance between the position of the subject vehicle under the turning control in the turning control zone and the position of the solid object.

7. The driving support system for a vehicle as set forth in claim 4, wherein
in cases where the avoidance target path becomes a path in which the collision between the subject vehicle and the solid object cannot be avoided, the turning permission unit permits the execution of the turning control of the subject vehicle by the support control unit, without regard to the distance between the position of the subject vehicle under the turning control in the turning control zone and the position of the solid object.

8. The driving support system for a vehicle as set forth in claim 1, wherein
the predetermined control starting point is set based on the distance which is traveled by the subject vehicle for a delay time taken from when the turning permission unit permits the execution of the turning control of the subject vehicle until when the subject vehicle actually starts turning, and the position of the subject vehicle at the current point in time.

9. The driving support system for a vehicle as set forth in claim 8, wherein
in cases where the avoidance target path becomes a path in which the collision between the subject vehicle and the solid object cannot be avoided, the turning permission unit permits the execution of the turning control of the subject vehicle by the support control unit, without regard to the distance between the position of the subject vehicle under the turning control in the turning control zone and the position of the solid object.

10. The driving support system for a vehicle as set forth in claim 1, wherein
the turning permission unit permits the execution of the turning control of the subject vehicle by the support control unit, in cases where the distance between the position of the subject vehicle under the turning control and the position of the solid object becomes equal to or less than the predetermined avoidance distance, in an entire range of the turning control zone.

11. The driving support system for a vehicle as set forth in claim 10, wherein
the predetermined control end point is set as the position of the subject vehicle in the avoidance target path at a time point at which the subject vehicle begins to move away from the solid object due to the turning control of the subject vehicle being carried out by the support control unit, or at a time point at which the distance between the subject vehicle and the solid object begins to be constant due to the turning control of the subject vehicle being carried out by the support control unit.

12. The driving support system for a vehicle as set forth in claim 10, wherein
the support control unit causes the subject vehicle to travel along the avoidance target path, by carrying out the braking control of the subject vehicle in addition to the turning control.

13. The driving support system for a vehicle as set forth in claim 11, wherein
in cases where the avoidance target path becomes a path in which the collision between the subject vehicle and the solid object cannot be avoided, the turning permission unit permits the execution of the turning control of the subject vehicle by the support control unit, without regard to the distance between the position of the subject vehicle under the turning control in the turning control zone and the position of the solid object.

14. The driving support system for a vehicle as set forth in claim 10, wherein
the predetermined control starting point is set based on the distance which is traveled by the subject vehicle for a delay time taken from when the turning permission unit permits the execution of the turning control of the subject vehicle until when the subject vehicle actually starts turning, and the position of the subject vehicle at the current point in time.

15. The driving support system for a vehicle as set forth in claim 14, wherein
in cases where the avoidance target path becomes a path in which the collision between the subject vehicle and the solid object cannot be avoided, the turning permission unit permits the execution of the turning control of the subject vehicle by the support control unit, without regard to the distance between the position of the subject vehicle under the turning control in the turning control zone and the position of the solid object.

16. The driving support system for a vehicle as set forth in claim 12, wherein
the predetermined control end point is set as a stop point in the avoidance target path at which the subject vehicle is stopped by the turning control and the braking control of the subject vehicle being carried out by means of the support control unit.

17. The driving support system for a vehicle as set forth in claim 16, wherein
in cases where the avoidance target path becomes a path in which the collision between the subject vehicle and the solid object can not be avoided, the turning permission unit permits the execution of the turning control of the subject vehicle by the support control unit, without regard to the distance between the position of the subject vehicle under the turning control in the turning control zone and the position of the solid object.

18. The driving support system for a vehicle as set forth in claim 12, wherein
in cases where the avoidance target path becomes a path in which the collision between the subject vehicle and the solid object cannot be avoided, the turning permission unit permits the execution of the turning control of the subject vehicle by the support control unit, without regard to the distance between the position of the subject vehicle under the turning control in the turning control zone and the position of the solid object.

19. The driving support system for a vehicle as set forth in claim 1, wherein
in cases where the avoidance target path becomes a path in which the collision between the subject vehicle and the solid object cannot be avoided, the turning permission unit permits the execution of the turning control of the subject vehicle by the support control unit, without regard to the distance between the position of the subject vehicle under the turning control in the turning control zone and the position of the solid object.

20. The driving support system for a vehicle as set forth in claim 10, wherein
in cases where the avoidance target path becomes a path in which the collision between the subject vehicle and the solid object cannot be avoided, the turning permission unit permits the execution of the turning control of the subject vehicle by the support control unit, without regard to the distance between the position of the subject vehicle under the turning control in the turning control zone and the position of the solid object.

* * * * *